(12) United States Patent
Bobbitt et al.

(10) Patent No.: US 7,448,542 B1
(45) Date of Patent: Nov. 11, 2008

(54) METHOD FOR DETECTING A NON-SCAN AT A RETAIL CHECKOUT STATION

(75) Inventors: Russell P. Bobbitt, Pleasantville, NY (US); Myron Flickner, San Jose, CA (US); Arun Hampapur, Norwalk, CT (US); Charles A. Otto, Lansing, MI (US); Sharathchandra U. Pankanti, Norwalk, CT (US); Unsang Park, East Lansing, MI (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/115,238

(22) Filed: May 5, 2008

(51) Int. Cl.
*G06K 15/00* (2006.01)
*G06K 7/10* (2006.01)
*G06K 7/14* (2006.01)
*G06Q 20/00* (2006.01)
*H04N 7/18* (2006.01)
*H04N 9/47* (2006.01)
*A63F 9/02* (2006.01)

(52) U.S. Cl. .................. 235/383; 235/462.01; 235/454; 705/23; 348/150; 186/61

(58) Field of Classification Search ............ 235/462.11, 235/462.31, 462.41, 462.14; 705/18, 23; 348/150; 186/59, 61
See application file for complete search history.

(56) References Cited

U.S. PATENT DOCUMENTS

| | | | | |
|---|---|---|---|---|
| 5,609,223 A | * | 3/1997 | Iizaka et al. | 235/383 |
| 5,747,784 A | * | 5/1998 | Walter et al. | 235/383 |
| 5,883,968 A | * | 3/1999 | Welch et al. | 382/100 |
| 6,056,087 A | * | 5/2000 | Addy et al. | 235/383 |
| 6,354,498 B1 | * | 3/2002 | Lutz | 235/385 |
| 7,059,527 B2 | * | 6/2006 | Mergenthaler et al. | 235/383 |
| 7,118,026 B2 | | 10/2006 | Harris et al. | |
| 7,246,745 B2 | * | 7/2007 | Hudnut et al. | 235/383 |
| 7,334,729 B2 | | 2/2008 | Brewington | |
| 2004/0118916 A1 | * | 6/2004 | He | 235/383 |
| 2006/0104479 A1 | * | 5/2006 | Bonch-Osmolovskiy et al. | 382/103 |
| 2007/0057049 A9 | | 3/2007 | Kundu et al. | |
| 2008/0149725 A1 | * | 6/2008 | Rosenbaum | 235/462.41 |

FOREIGN PATENT DOCUMENTS

JP      6-28575 A   *   2/1994

\* cited by examiner

*Primary Examiner*—Jared J Fureman
(74) *Attorney, Agent, or Firm*—Cantor Colburn LLP; Mark Wardas

(57) ABSTRACT

A method for detecting a non-scan at a retail checkout station includes detecting the passing of an item across a scanner device of a retail checkout station, obtaining an image of the item passing across the scanner, detecting a scan of an item passing across the scanner to establish a scanned item, and establishing a register associated with the scanned item. A scan occurs if the image of the item passing across the scanner substantially matches the register associated with the scanned item. Conversely, a non-scan is triggered when the image of the item passing across the scanner does not match the register associated with the scanned item.

4 Claims, 3 Drawing Sheets

METHOD FOR DETECTING A NON-SCAN AT A RETAIL CHECKOUT STATION

BACKGROUND OF THE INVENTION

1. Field of the Invention

This invention relates to the art of retail checkout stations and, more particularly, to a method of detecting a non-scan at a retail checkout station.

2. Description of Background

It is well known that shrinkage is a significant problem in the retail industry. It has been observed that a large proportion of retail shrinkage is a result of cashier fraud. Current methods to detect cashier fraud depend on human supervision. Human supervision is both costly and non-scalable as the number of cashiers increases. Even without considering labor and scalability issues, some types of cashier fraud, such as "non-scans" are difficult for humans to detect.

A non-scan occurs when a cashier intentionally fails to scan, often referred to as "sweet hearting" or unintentionally, i.e., accidentally, fails to properly pass a product over a barcode scanner region of the checkout station. In general, there are two methods by which intentional non-scans are committed. The first method involves positioning a product so that a product barcode is pointed away from the scanner. An alternative method is to cover the barcode so that the scanner is unable to detect it. To the casual observer, a non-scan appears to be a legitimate scan. Unintentional non-scans typically result from a lack of attention on the part of the cashier.

A human might perhaps detect intentional and unintentional non-scans by being extremely vigilant or through the aid of a video surveillance system with cameras positioned over the barcode scanners. In either case, detection requires careful observation of the cashier, either directly or via captured images. Thus, a single individual would only be able to monitor one cashier or camera at a time to detect fraud. In order for such a system to be cost-effective, on average each cashier would have to contribute to retail shrinkage at a rate greater than the pay rate of a loss prevention (LP) officer assigned to observe the cashier. An additional issue exists in the amount of tedium involved in these observations. It is unlikely that a human observer would be capable of maintaining high attention levels for extended periods.

In addition to visual monitoring, auditory monitoring is another potential method of preventing loss. Barcode scanners often emit an audible beep when a proper scan occurs. Thus, an LP officer could listen for the presence of a beep for each item being scanned. In such a case, the LP officer would need to be in close proximity to the cashier being observed, i.e., each cashier would require a dedicated LP officer. A dedicated LP officer at each checkout station would add considerably to resource allocation and in no way mitigate the tedium discussed above. Furthermore, it is often difficult or impossible to differentiate between sounds when multiple cashiers are in close proximity, or if the ambient environment is noisy.

SUMMARY OF THE INVENTION

The shortcomings of the prior art are overcome and additional advantages are provided through the provision of a method for detecting a non-scan at a retail checkout station. The method includes detecting the passing of an item across a scanner device of a retail checkout station, obtaining an image of the item passing across the scanner, detecting a scan of an item passing across the scanner to establish a scanned item, and establishing a feature associated with the scanned item. Establishing that the image of the item passing across the scanner substantially matches the feature associated with the scanned item. Triggering a non-scan if the image of the item passing across the scanner does not match the feature associated with the scanned item.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

TECHNICAL EFFECTS

As a result of the summarized invention, technically we have achieved a solution, which enables a retail storeowner to monitor cashier activity to reduce shrinkage associated with sweet hearting or the intentional failure of a cashier to properly scan an item to be purchased. Non-scan events are evaluated real time or forensically to determine if a particular cashier(s) is responsible for inventory shrinkage. In addition, by virtually eliminating false-positives thereby increasing non-scan detection reliability.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
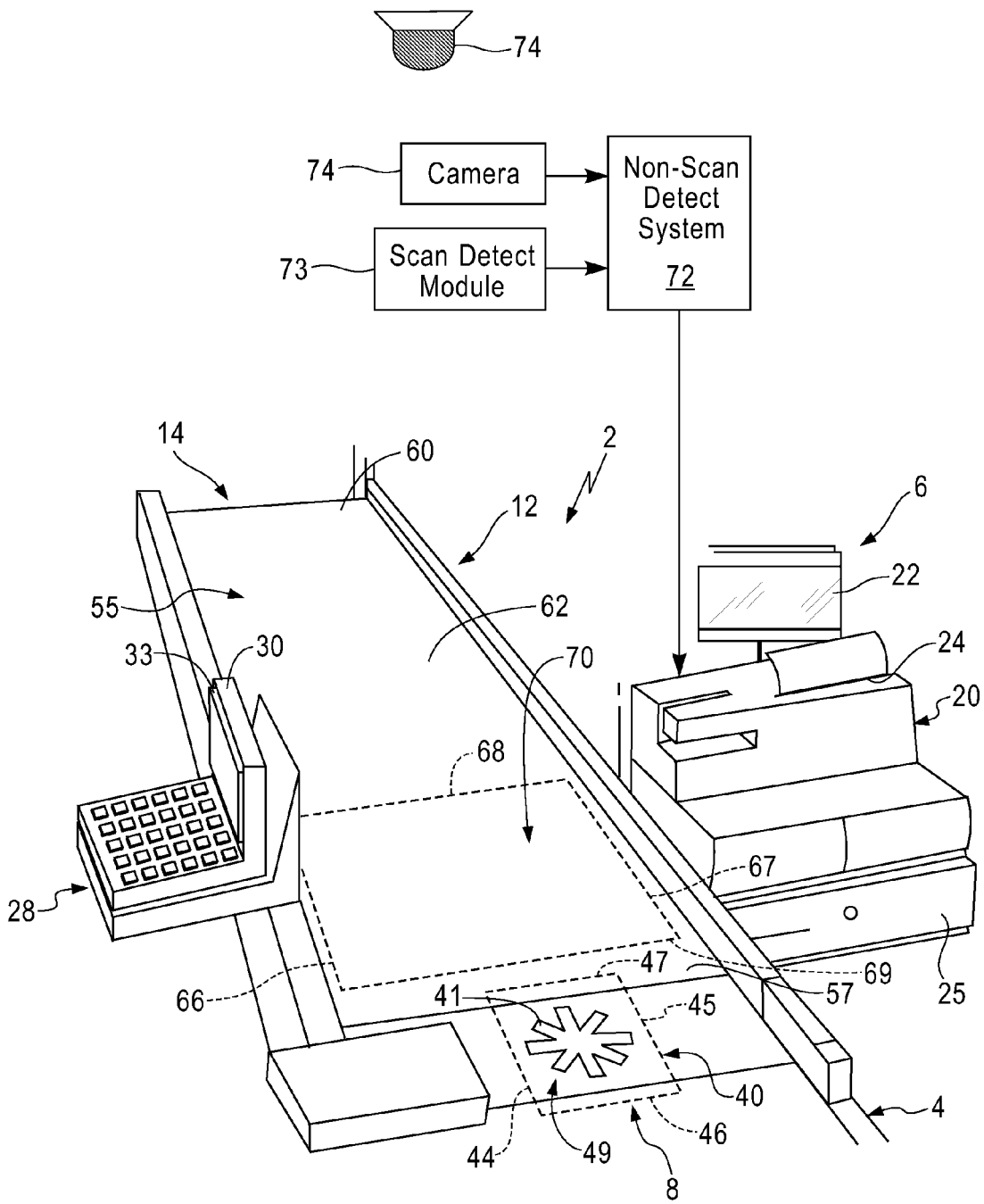
FIG. 1 is a right perspective view of a retail checkout station including a system for detecting a non-scan of an item to be purchased in accordance with an exemplary embodiment of the present invention.

With initial reference to FIG. 1, a checkout station constructed in accordance with an exemplary embodiment of the present invention is generally shown at 2. Checkout station 2 includes a main housing 4 that establishes a cashier portion 6, a product scanning portion 8, a product transport portion 12, and a bagging portion 14. Cashier portion 6 includes a register 20 having a display portion 22, a printer portion 24 and a cash drawer 25. Cashier portion 6 also includes an input zone 28 having a keypad/card reader 30, and a display 33.

Product scanning portion 8 includes a scanning surface 40 having a product scanner device 41 provided with a plurality of trip wires 44-47 that establish a first region of interest (ROI) 49. Trip wires 44-47 can be a plurality of energy (light, sound etc) beams or simple a boundary designating a particular area or reference zone(s) in an image. Product scanner device 41 scans or reads product identification codes, such as Universal Product Code (UPC), industrial symbol(s), alphanumeric character(s) or other indicia associated with items to be purchased.

Product transport portion 12 includes a conveyor belt 55 that moves purchased products from product scanner device 41 to bagging portion 14. Towards that end, conveyor belt 55 includes a first end portion 57 positioned adjacent product scanner 41 that extends to a second end portion 60 through an intermediate portion 62. As will be discussed more fully below, first end portion 57 includes a plurality of trip wires 66-69 that establish a second ROI 70. Trip wires 66-69, in a manner similar to that described above, can be plurality of energy beams or simply a boundary designating a particular area or reference zone in an image. In accordance with an exemplary embodiment of the invention, checkout station 2 also includes a non-scan detect system 72 having a scan detection module 73 that is employed in connection with a camera 74 to detect non-scans at checkout station 2. At this point it should be understood that the term "scan" means a successful reading of a product identification code, e.g., UPC symbol, by a scanner. The term "non-scan" means an unsuccessful reading of the product identification code either accidentally, or with intent. In any event, scan detection module 73 can include a direct connection between product scanner device 41 and non-scan detect system 72, a microphone that scans for the typical beep associated with a proper scan, or a link to a data-base that is updated real-time each time a bar code or the like is registered at product scanner device 41.

Figure 2:
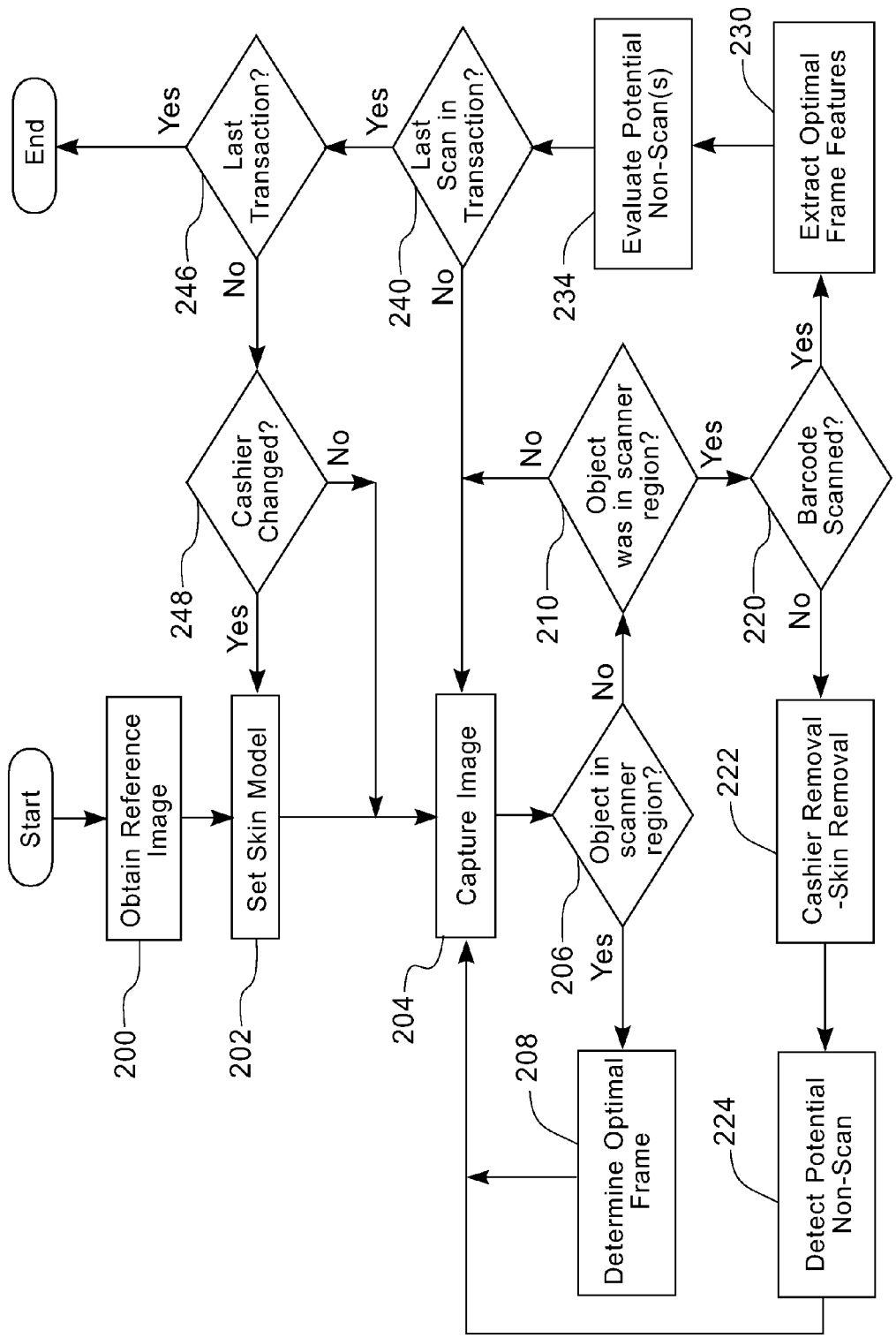
FIG. 2 is a flow diagram illustrating a method for detecting a non-scan of an item to be purchased in accordance with an exemplary embodiment of the present invention.

Reference will now be made to FIG. 2 in describing a method for detecting a non-scan at checkout station 2 employed by non-scan detection system 72. Initially, camera 74 captures a reference image of product scanner device 41 with no objects present as indicated in block 200. After obtaining the reference image, a skin model is implemented in block 202. As will be discussed more fully below, the skin model is employed by non-scan detect system 72 to remove portions of the cashier, i.e., hands, arm, etc., that might otherwise interfere with captured images. At this point, non-scan detect system 72 begins scanning for objects passing through first and second ROI's 49 and 70. Once an object is detected in ROI 49 or ROI 70 by, for example, detecting the object passing though trip wires 44-47 and/or 66-69, an image(s) of the object passing through ROI 49 and/or ROI 70 is/are captured by camera 74 as indicated in block 204. At this point, a determination is made whether the object is actually in one of ROI 49 and ROI 70 as indicated on block 206. An object is sensed within ROI 49 and/or ROI 70 by a breaking of trip wires 44-47 and/or 66-69. In addition, an object can be detected by a spatiotemporal relationship of the object in ROI 49 and/or ROI 70. When the object is present within ROI 49 and/or ROI 70 an optimal image or frame is obtained in block 208. Once the object is determined to no longer be in one of ROI 49 and/or ROI 70 non-scan detect system 72 determines whether the object was in proximity to product scanner device 41 in block 210. If not, scanning continues in block 204, however, if an object was in proximity to product scanner device 41, non-scan detect system 72 determines whether a proper scan took place.

Often times, an item will pass though ROI 49 and/or ROI 70 multiple times before a scan is recorded. That is, product scanner device 41 might be dirty, bar codes might be wrinkled, damaged or otherwise difficult to scan or the cashier might have the object at an improper angle for scanning. In any event, if the product is not scanned, e.g., a bar code associated with the product is not recorded/registered by product scanner 41, as determined in block 220, each non-scan is saved in memory and the optimal frame captured in block 208 for each non-scan is filtered to remove objects not associated with the scanned item such as, portions of the cashier as detected by the skin model in block 222. At this point, non-scan detect system 72 determines whether a candidate or potential non-scan exists in block 224. A potential non-scan is indicated when the optimal frame, as captured in block 208, for each non-scan is determined to contain a product. Once it has been determined that an object is present in a given frame, the optimality of that frame is determined in block 230. The optimality of the frame is determined based on a variety of techniques, such as but not limited to, comparing object size to size thresholds or analyzing object characteristics/features or consistency with characteristics that are exhibited by products or classes of products. Product characteristics may be input manually or learned automatically. The characteristics/features of the object could also be employed to further enhance the determination that an object is present within ROI 49 and/or ROI 70. In any case, if no object is present in the optimal image, non-scan detect system 72 returns to block 204. If, however, a potential non-scan is indicated in block 224, and an object is detected in block 230, features of the product, such as color, shape, position, texture, etc., are extracted from the optimal frame and stored in an internal data structure (not shown) such as a stack, in anticipation of the next barcode scanned in block 200. The next bar code scanned in block 200 establishes a scanned item. At this point, non-scan detect system 72 evaluates any potential non-scans against the scanned item in block 234.

Figure 3:
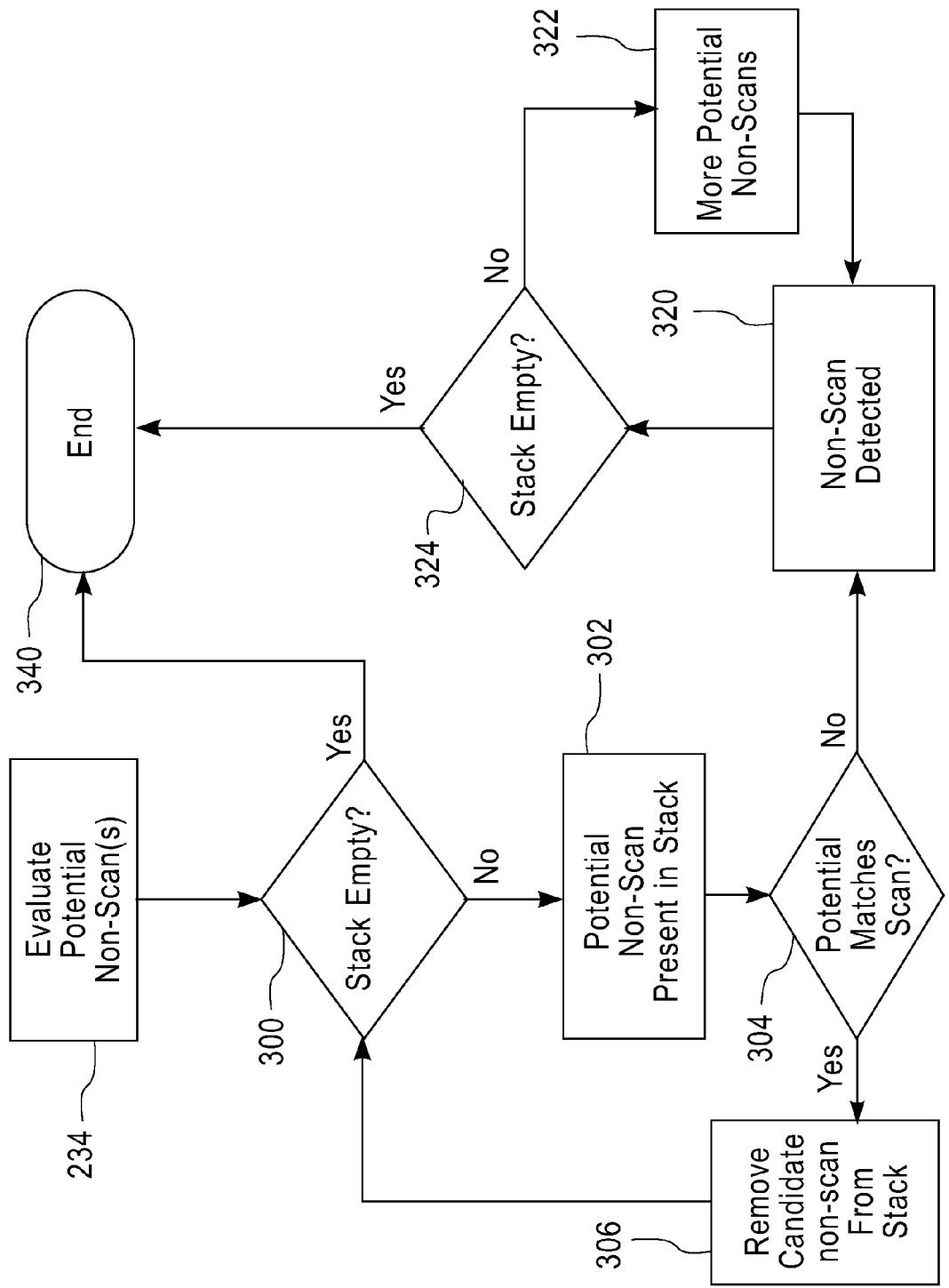
FIG. 3 is a flow diagram illustrating a method of evaluating a potential non-scan of an item to be purchased in accordance with an exemplary embodiment of the present invention.

Reference will now be made to FIG. 3 in describing a method of evaluating potential non-scans employed in block 234. At first, a determination is made whether any potential non-scans of the product exist in a stack or memory in block 300. If the product was scanned properly the first time, an a cashier did not intentionally or unintentionally pass any products over scanning surface 40 without an intervening signal from checkout station 2 indicating a successful scan of the product, no non-scan exists and evaluation is complete. If, however, one or more potential non-scans do exist, evaluation continues. In block 302, each potential non-scan is extracted and a determination is made whether the product in the optimal frame matches the feature of the product obtained in block 230. If a match is found, a non-scan is contra-indicated, and the non-scan is deleted as indicated in block 306, and non-scan detect system 72 checks for additional non-scans of the product in block 302. If however, a match is not found, an actual non-scan is indicated in block 320. At this point, non-scan detect system 72 determines whether any additional potential non-scans of the product exist in memory. If so, each additional potential non-scan of the product is designated as an actual non-scan in block 322. In this manner, non-scan detect system virtually eliminates any occurrence of false-positive indications of a non-scan event.

Once evaluation is complete in block 234, non-scan detect system 72 checks whether there are additional items to process for the transaction in block 240. If so, scanning and monitoring continue in block 224. If not, the transaction is complete and a determination is made whether additional transactions will occur in checkout station 2 in block 246. If so, non-scan detect system 72 confirms the identity of the cashier in block 248. If a new cashier is present, a new skin model is set in block 202, else scanning and monitoring continues. If, in block 246, the transaction is determined to be the last transaction of a particular period, scanning and monitoring end.

At this point it should be appreciated that exemplary embodiments of the present invention provide a system and method for determining whether non-scans of products are occurring at a checkout station. The system and method are employed by store personnel as real time, or forensic indicators of "sweet hearting" or a cashier giving away merchandise without receiving payment. The system can be operated with little or no human interaction thereby increasing detections without the need for a dedicated Loss Prevention LP officer for each checkout station and/or constant rotation of LP officers to different roles to limit inattention due to boredom.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for detecting a non-scan at a retail checkout station comprising:

detecting the passing of an item across a scanner device of a retail checkout station;

determining that the item passing across the scanner device was not registered as a scan;

establishing a potential non-scanned item based on the item not being registered as a scan;

obtaining an image of the potential non-scanned item;

establishing a scanned item based on an item passing across the scanner device being registered as a scan;

extracting features associated with the scanned item;

comparing the features associated with the scanned item with the image of the potential non-scanned item; and triggering an actual non-scan if the features of the scanned item do not substantially match the image of the potential non-scanned item.

2. The method of claim 1, further comprising:

detecting an object not associated with the potential non-scanned item; and removing the object not associated with the potential non-scanned from the image of the potential non-scanned item.

3. The method of claim 2, wherein detecting the object not associated with the potential non-scanned item includes detecting a portion of a cashier moving the potential non-scanned item across the scanner device.

4. The method of claim 1, further comprising:

detecting multiple attempts to scan an item;

establishing multiple potential non-scanned items based on the item not being registered as a scan; and evaluating each of the multiple potential non-scanned items prior to indicating an actual non-scan of the item.

* * * * *